United States Patent [19]

Lange et al.

[11] 4,370,023
[45] Jan. 25, 1983

[54] LONGITUDINAL WATER-TIGHT LIGHT WAVEGUIDE CABLE AND THE METHOD OF MANUFACTURE

[75] Inventors: Gerhard Lange; Helmut Saller, both of Munich, Fed. Rep. of Germany

[73] Assignee: Siemens Aktiengesellschaft, Berlin & Munich, Fed. Rep. of Germany

[21] Appl. No.: 202,348

[22] Filed: Oct. 30, 1980

[30] Foreign Application Priority Data

Nov. 14, 1979 [DE] Fed. Rep. of Germany ....... 2946027

[51] Int. Cl.³ .......................... G02B 5/14; G02B 5/16
[52] U.S. Cl. .................................. 350/96.23; 252/317
[58] Field of Search ................... 350/96.23; 174/23 R, 174/23 C, 110 R, 110 S, 107, 70 R, 70 S; 252/317

[56] References Cited

U.S. PATENT DOCUMENTS 3,903,013  9/1975  Foord et al. .................. 252/317
4,331,379  5/1982  Oestreich et al. ............. 350/96.23

FOREIGN PATENT DOCUMENTS 2728642  1/1979  Fed. Rep. of Germany .
1435007  5/1976  United Kingdom .

*Primary Examiner*—Marvin L. Nussbaum
*Attorney, Agent, or Firm*—Hill, Van Santen, Steadman, Chiara & Simpson

[57] ABSTRACT

The invention relates to a cable, particularly to a light waveguide cable, in which at least one conductor, particularly a fiber-shaped light waveguide, is arranged in the interior of a protective sheathing and the remaining inside space is filled out with a gel-like substance. The substance consists of a mixture comprising an oil and a thixotropic agent.

31 Claims, 1 Drawing Figure

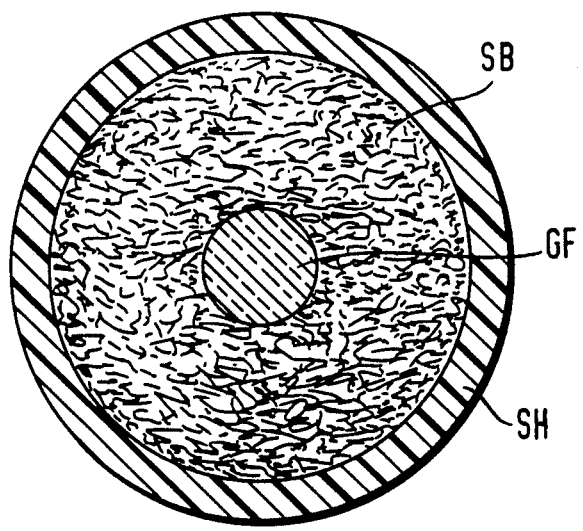

LONGITUDINAL WATER-TIGHT LIGHT WAVEGUIDE CABLE AND THE METHOD OF MANUFACTURE

BACKGROUND OF THE INVENTION

The present invention is directed to a longitudinal water-tight waveguide cable in which at least one fiber-shaped waveguide is arranged in an interior of a protective sheath and the remaining inside space of the sheath is filled with a gel-like substance.

A longitudinal water-tight light waveguide cable is disclosed in German O.S. No. 27 28 642, and the cable has a sheath containing at least one optical waveguide such as a fiber which is supported in the sheath by a viscous substance which will no longer flow or drip from the sheath. The substance is formed by weakly cross-linking silicone resins, polyester resins, thermoplastics, polyeurethane rubbers or expanded polystyrol in oil. A good longitudinal water tightness can be achieved with the light waveguide cables constructed in this manner.

However, it should also be assured that the substance which serves as the filling compound does not create tensile forces or pressure forces on the light waveguides since attenuation of the light waveguide conductors would otherwise be increased due to the application of such forces. In order to achieve this with the cross-linking filling compounds of the above-mentioned reference, a relatively high portion of softeners must be used.

In general, when utilizing a cable filling compound for light waveguide cables, there exists a problem that the filling substance for the filling compound should be sufficiently thin bodied or fluid during the filling operation in order to either simplify or make possible the step of filling the substance into the sheath of the cable. A largely-temperature independent gel-like consistency is to be achieved in the filled cable in order to avoid the creation of tensile or pressure forces which would increase the attenuation in the light waveguide. Moreover, there is a demand that the substance employed as the filling compound should be easy to manipulate and be economical.

SUMMARY OF THE INVENTION

The present invention is to create a substance for the use as a filling compound in an optical cable having at least one fiber-like conductor disposed in an outer sheath which filling compound is easy to work and is particularly economical to use.

To accomplish these tasks, the present invention is directed to an improvement in a light waveguide cable having at least one fiber shaped light waveguide, such as an optical fiber, arranged in the interior of the protective sheath and the remaining inside space of the sheath being filled with a gel-like substance. The improvement being said gel-like substance being a mixture of an oil and a thixotropic agent.

The oil of the mixture represents a largely viscous fluid and a desired effects are achieved by means of the added thixotropic agent. Thus, the mixture of the oil and the thixotropic agent forms a non-flowing or nearly solid yet nonetheless gel-like body while in a rest condition; however the mixture will assume the properties of a fluid under mechanical stresses so that the light waveguide can move practically freely therein. If on the other hand the external mechanical stresses are so low that a liquefaction of the mixture or substance has not yet occurred, the gel-like consistency of the substance of the mixture will enable a very low, unimpeded movement of the light waveguide and thus prevent inadmissible mechanical loads to be applied on the waveguides.

A further advantage of the inventive substance or mixture consists that the oil respective of the substance can be selected in such a manner that the interaction with the material of the coatings (the coatings per se and the polymers forming the conductors) employed as a protective coating on the light waveguide fiber and/or with the protective sheath can be avoided in a simple manner.

When a mechanical force occurs in a specific area of the cable either during its manufacture or during its processing such as the laying of the cable, the light waveguide is not inadmissibly impeded in its mobility and can assume a position which is either completely free of mechanical stresses or has the mechanical stresses greatly reduced. By so doing, the good optical transmission properties of the cable will remain unchanged. The inventive substance of the mixture also has the particular advantage that its above mentioned properties are retained within a wide temperature range for example of a range between $-10°$ through $+80°$ C.

In the method for manufacturing the cable, includes an improvement to the step of extruding the sheath onto the optical fibers forming the optical waveguides, the improvement is creating a mixture of an oil and the thixotropic agent and injecting the mixture under pressure through a thin hollow needle or cannula into the protective sheath during the step of extruding so that mixture will solidify directly after emerging from the needle and can no longer flow out of the sheath.

In order to guarantee that the oil remains fixed in the gel-phase, even under extreme conditions and for a long time, it is expedient to add an organic thickener to the substance. These thickeners comprise polymers selected from a grohp consisting of halogenated hydrocarbon polymers, halogen-free hydrocarbon polymers and mixture of halogenated and halogen-free hydrocarbon polymers.

In order to prevent potential and favorable influences of oxygen particularly atmospheric oxygen on the oil and/or the thickeners contained in the substance, an antioxidant is expediently added to the mixture. The antioxidant may be either a polymer 2, 2, 4 trimethyl-1, 2 dihydroquinolene or a polymer 4, 4'-thiobis-(3 methyl-6-tertiary buthylphenol). Approximately 0.1 weight percent of the antioxidant is required.

A dye may be added to the mixture to aid in identification.

When the mixture is used as a core filling compound of material, inorganic fillers such as kaolin, chalk, or the like are added to the mixture. The amount of these inorganic filling fillers may be approximately 10 weight percent of the mixture.

The oil or the mixture may be selected from a group consisting of aliphatic hydrocarbon oils, aromatic hydrocarbon oils and mixture of aliphatic and aromatic hydrocarbon oils. Thus, the oil may be a parafin oil. In addition, the oil may be a silicone oil or also may be a hydrogenated biphenyl in particular a chlorinate biphenyl.

The thixotropic agent may consist of colloidal silicic acid, either with or without aluminum $Al_2O_3$. In addition the agent may be either carbon or a modified montmorillonite, or combinations of the silicic acid, carbon and the montmorillonite.

under certain conditions and the additive T is an inorganic filler.

TABLE

| | Base Oils | | | Thixotropic Agents | | | Thickener, Organic | | Additives | | |
|---|---|---|---|---|---|---|---|---|---|---|---|
| | A | B | C | D | E | F | G | H | R | S | T |
| Viscosity (mPa·s) | 5-10⁴ | 5-10⁴ | 1-20 (100° C.) | — | — | — | 10³-10⁵ (180° C.) | — | | | |
| active surface m²/g | — | — | — | 50-500 | 20-10³ | — | — | — | | | |
| gram-molecular weight | — | — | — | — | — | — | — | 10³-10⁴ | | | |
| Softening point | | | | — | — | — | 90° C. | 90° C. | | | |
| filling compound for fiber in sheath | | | | | | | | | | | |
| 1. Wt % | 98-50 | — | — | 2-20 | 2-40 | 0.2-10 | 0-50 | 0-20 | x | x | — |
| 2. Wt % | — | 98-50 | — | 2-20 | 2-40 | 0.2-10 | — | — | — | x | — |
| 3. Wt % | — | — | 98-50 | 2-20 | 2-40 | 0.2-10 | 0-50 | 0-20 | x | x | — |
| Core filling compound | | | | | | | | | | | |
| 1. Wt % | 98-30 | — | — | 2-20 | 2-40 | 0.2-10 | 0-50 | 0-20 | x | x | |
| 2. Wt % | — | 98-30 | — | 2-20 | 2-40 | 0.2-10 | — | — | — | x | |
| 3. Wt % | — | — | 98-30 | 2-20 | 2-40 | 0.2-10 | 0-50 | 0-20 | x | x | |
| filling compound for fiber in sheath | | | | | | | | | | | |
| 1. Wt % | 72 | — | — | 3 | — | — | 25 | — | 0.1 | x | — |
| 2. Wt % | — | 96 | — | 4 | — | — | — | — | — | x | — |
| 3. Wt % | — | — | 90 | 6 | — | — | — | 4 | 0.1 | x | — |
| Core filling compound | | | | | | | | | | | |
| 1. Wt % | 78 | — | — | 2 | — | — | 20 | — | 0.1 | x | — |
| 2. Wt % | — | 80 | — | 10 | — | — | — | — | — | x | 10 |
| 3. Wt % | — | — | 70 | 10 | — | 5 | — | 5 | 0.1 | x | 10 |

BRIEF DESCRIPTION OF THE DRAWING

The FIGURE is a cross-sectional view of a cable in accordance with the present invention.

DESCRIPTION OF THE PREFERRED EMBODIMENTS

The principles of the present invention are particularly useful in a light waveguide cable illustrated in the Figure. The cable has at least one fiber shaped light waveguide GF received in an interior of a protective sheath SH with the remaining portions of the interior space being filled with a gel-like substance SB which is a mixture of at least an oil and a thixotropic agent. It should be noted that while the drawing illustrates only a single optical waveguide or optical fiber, a plurality may be provided in the protective sheath. In addition, a plurality of sheaths containing either one or more optical fibers can be arranged in an outer jacket with the interior space between the plurality of sheaths also having a filling material formed of the mixture of the present invention. Thus, the mixture may be used as either core filling materials or conductor filling materials.

A series of sample embodiments of the mixture of the present invention are set forth in the table. The table includes technical data such as physical properties for different base oils, thixotropic agents, organic thickeners and additives along with the different percentages for different examples. Base oil A is an aromatic and/or aliphatic hydrocarbon oil, base oil B is a silicone oil and base oil C is a halogenated biphenyl. The thixotropic agents D is a colloidal silicic acid with or without Al₂O₃ while the agent E is carbon and the agent F is a modified montmorillonite.

The organic thickeners G is composed of halogenated and halogen-free hydrocarbon polymers where the thickener H is comprised of halogenated and halogen-free hydrocarbon waxes. The additive R is an antioxidant while the additive S is a dye which is added From the table various mixtures in accordance with the present invention are illustrated which gave favorable values during testing. It should be noted that when the substance is used as conductor filling material or compound the oil is between 50 and 90 weight percent of the mixture and when the substance is used for a core filling material or compound the oil is between 30 and 90 weight percent of the mixture. It can also be seen that the colloidal silicic acid (thixotropic agent D) is between 2 and 20 weight percent of the mixture, the carbon (thixotropic agent E) is 2 to 40 weight percent of the mixture and the modified montmorillonite (thixotropic agent F) is between 0.2 through 10 weight percent of the mixture.

From the table, it is noted that the dye (additive S) is in trace amounts indicated by x. Also, the antioxidant (additive R) may be in trace amounts or 0.1 weight percent.

From the table, various and appropriate mixtures can be obtained. For example, it is found that a useful conductor filling compound contains approximately 72 weight percent of the aromatic or aliphatic hydrocarbon oils, approximately 3 weight percent of the colloidal silicic acid, and approximately 25 percent of the hydrocarbon polymers as a thickener. Another useful conductor filling material are a mixture of approximately 96 weight percent of the silicone oil with approximately 4 weight percent of the colloidal silicic acid and a mixture with approximately 90 weight percent halogenated biphenyls, approximately 6 weight percent colloidal silicic acid and 4 weight percent thickeners formed from hydrocarbon waxes.

Other useful mixtures were approximately 78 weight percent aromatic or aliphatic hydrocarbon oils, approximately 2 weight percent colloidal silicic acid, approximately 20 weight percent thickeners formed of hydrocarbon polymers or a mixture of 80 weight percent silicone oil, 10 weight percent colloidal silicic acid and approximately 10 weight percent inorganic filler. Another useful mixture was 70 weight percent halogenated biphenyls, approximately 10 weight percent montmorillonite, approximately 5 weight percent hydrocarbon waxes and approximately 10 weight percent inorganic fillers.

A viscosity of the hydrocarbon oils (base oil A) or the silicone oils (base oil B) is selected to be in a range of 5–10,000 mPa.s and preferably in a range of between 200 and 400 mPa.s. The biphenyls have a viscosity of 1 to 20 mPa.s.

The product of The Kronos-Titan Company known under the tradename "BENTONITE" can advantageously be used as the modified montmorillonite.

Although various minor modifications may be suggested by those versed in the art, it should be understood that we wish to embody within the scope of the patent granted hereon, all such modifications as reasonably and properly come within the scope of our contribution to the art.

We claim:

1. In a light waveguide cable having at least one fiber-shaped light waveguide being arranged in an interior of a protective sheath and the remaining inside space of the sheath being filled with a gel-like substance, the improvement being said gel-like substance being a mixture of an oil, an organic thickener and a thixotropic agent, said thickener comprising polymers selected from a group consisting of halogenated hydrocarbon polymers, halogen-free hydrocarbon polymers and mixtures of halogenated and halogen-free hydrocarbon polymers.

2. In a light waveguide cable according to claim 1, wherein said oil is selected from a group consisting of aliphatic hydrocarbon oils, aromatic hydrocarbon oils and mixtures of aliphatic and aromatic hydrocarbon oils.

3. In a light waveguide cable according to claim 2, wherein said oil is a parafin oil.

4. In a light waveguide cable according to claim 1, wherein said oil consists of a silicone oil.

5. In a light waveguide cable according to claim 1, wherein said oil consists of a halogenated biphenyl.

6. In a light waveguide cable according to claim 5, wherein the biphenyl is a chlorinated biphenyl.

7. In a light waveguide cable according to claim 1, wherein the thixotropic agent comprises a colloidal silicic acid.

8. In a light waveguide cable according to claim 7, wherein the colloidal silicic acid has an additive of $Al_2O_3$.

9. In a light waveguide cable according to claim 7, wherein the colloidal silicic acid is 2 to 20 weight percent of the mixture.

10. In a light waveguide cable according to claim 1, wherein the thixotropic agent comprises carbon.

11. In a light waveguide cable according to claim 10, wherein the carbon is 2 through 40 weight percent of the mixture.

12. In a light waveguide cable according to claim 1, wherein thixotropic agent comprises a modified Montmorillonite.

13. In a light waveguide cable according to claim 12, wherein the modified Montmorillonite is between 0.2 through 10 weight percent of the mixture.

14. In a light waveguide cable according to claim 1, wherein said polymer is 0 through 50 weight percent of the mixture.

15. In a light waveguide cable according to claim 1, wherein the thickener comprises a wax selected from a group consisting of halogenated hydrocarbon waxes, halogen-free hydrocarbon waxes, and mixtures of halogenated and halogen-free hydrocarbon waxes.

16. In a light waveguide cable according to claim 15, wherein the hydrocarbon waxes are 0 through 20 weight percent of the mixture.

17. In a light waveguide cable according to claim 1, wherein said mixture includes an antioxidant in the magnitude of approximately 0.1 weight percent of the mixture.

18. In a light waveguide cable according to claim 1, wherein the mixture contains an inorganic filler.

19. In a light waveguide cable according to claim 18, wherein the filler amounts to up to 10 weight percent of the mixture.

20. In a light waveguide cable according to claim 1, wherein said mixture additionally contains a dye for identification.

21. In a light waveguide cable according to claim 1, wherein said mixture consists of approximately 72 weight percent of an oil selected from a group consisting of aromatic and aliphatic hydrocarbon oils, of approximately 3 percent of colloidal silicic acid, and of approximately 25 weight percent of a thickener, said thickeners being hydrocarbon polymers.

22. In a light waveguide cable according to claim 1, wherein said mixture consists of approximately 96 weight percent of silicone oil and of approximately 4 weight percent of colloidal silicic acid.

23. In a light waveguide cable according to claim 1, wherein said mixture consists of approximately 90 weight percent of halogenated biphenyl, of approximately 6 weight percent of colloidal silicic acid, and of approximately 4 weight percent of a thickener, said thickener being hydrocarbon waxes.

24. In a light waveguide cable according to claim 1, wherein the mixture consists of approximately 78 weight percent of an oil selected from a group consisting of aromatic and aliphatic hydrocarbon oils, of approximately 2 weight percent of colloidal silicic acid, and of approximately 20 weight percent of a thickener, said thickeners being hydrocarbon polymers.

25. In a light waveguide cable according to claim 1, wherein the mixture consists of approximately 80 weight percent of silicone oil, of approximately 10 weight percent of colloidal silicic acid, and of approximately 10 weight percent of an inorganic filler.

26. In a light waveguide cable according to claim 1, wherein said mixture consists of about 70 weight percent of halogenated biphenyl, of approximately 10 weight percent of colloidal silicic acid, of approximately 5 weight percent of montmorillonite, of approximately 5 weight percent of hydrocarbon waxes, and of approximately 10 weight percent of an inorganic filler.

27. In a light waveguide cable according to claim 1 wherein said oil with a viscosity of a range of 5 to 10,000 mPa.s.

28. In a light waveguide cable according to claim 27, wherein said oil has a viscosity of a range of 200 to 400 mPa.s.

29. In a light waveguide cable according to claim 1, wherein the oil is a halogenated biphenyl with a viscosity in a range of 1 to 20 mPa.s.

30. In a light waveguide cable according to claim 1, wherein each fiber-shaped light waveguide is arranged in a tubular sheath with a filling material and said tubular sheaths are arranged in an outer sheath with a filling material, the filling material between the fiber and tubular sheath has the oil being between 50 and 98 weight percent of the mixture and the substance for the filling material between the tubular sheaths and the outer sheath has the oil being between 30 and 98 weight percent of the mixture.

31. In a method of manufacturing a light waveguide cable having at least one fiber-shaped light waveguide being arranged in an interior of a protective sheath and the remaining inside space of the sheath being filled with a gel-like substance comprising a mixture of an oil and a thixotropic agent, said method comprising extruding the protective sheath on the waveguide, the improvement comprising creating a mixture of an oil, an organic thickener and a thixotropic agent, and injecting the mixture under pressure through a hollow needle into the sheath during the step of extruding so that the mixture solidifies after said injection.

* * * * *